United States Patent
Etgen et al.

(10) Patent No.: US 12,117,853 B2
(45) Date of Patent: Oct. 15, 2024

(54) COOKING APPLIANCE WITH AUTOMATIC TIMER AND REMINDER

(71) Applicant: Haier US Appliance Solutions, Inc., Wilmington, DE (US)

(72) Inventors: Megan Etgen, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 483 days.

(21) Appl. No.: 17/412,358

(22) Filed: Aug. 26, 2021

(65) Prior Publication Data

US 2023/0065308 A1    Mar. 2, 2023

(51) Int. Cl.
| | | |
|---|---|---|
| *F24C 3/12* | (2006.01) | |
| *F24C 7/08* | (2006.01) | |
| *G05D 23/19* | (2006.01) | |

(52) U.S. Cl.
CPC ......... *G05D 23/1917* (2013.01); *F24C 3/128* (2013.01); *F24C 7/085* (2013.01); *F24C 7/086* (2013.01)

(58) Field of Classification Search
CPC ..... G05D 23/1917; F24C 3/128; F24C 7/085; F24C 7/086
USPC ...................................................... 126/19 R
See application file for complete search history.

(56) References Cited

U.S. PATENT DOCUMENTS

| | | | |
|---|---|---|---|
| 3,820,405 A | 6/1974 | Hong | |
| 5,693,245 A | 12/1997 | Clizbe | |
| 7,002,109 B2 | 2/2006 | Klask | |
| 2011/0251807 A1* | 10/2011 | Rada | G01D 4/00 |
| | | | 702/61 |
| 2016/0192446 A1 | 6/2016 | Seddik | |
| 2018/0228169 A1* | 8/2018 | Froelicher | F24C 15/006 |
| 2018/0321652 A1* | 11/2018 | Jablokov | G05B 19/042 |
| 2020/0271326 A1* | 8/2020 | Kozinski | F24C 3/124 |
| 2022/0186934 A1* | 6/2022 | Cowan | F24C 7/082 |
| 2022/0308537 A1* | 9/2022 | Neal | F24C 15/00 |

FOREIGN PATENT DOCUMENTS

| | | | | |
|---|---|---|---|---|
| DE | 102013114242 A1 * | 6/2015 | | F24C 7/085 |
| JP | 3303388 B2 | 7/2002 | | |
| JP | 2005326134 A | 11/2005 | | |

* cited by examiner

*Primary Examiner* — Avinash A Savani
(74) *Attorney, Agent, or Firm* — Dority & Manning, P.A.

(57) ABSTRACT

A method of operating a cooking appliance includes receiving an input from a user interface of the cooking appliance. The input includes a set temperature. In response to the received input, a heating element of the cooking appliance is activated. The method also includes detecting an opening and a closing of a door of the cooking appliance. The method further includes automatically initiating a timer when the closing of the door is detected.

18 Claims, 6 Drawing Sheets

COOKING APPLIANCE WITH AUTOMATIC TIMER AND REMINDER

FIELD OF THE INVENTION

The subject matter of the present disclosure relates generally to cooking appliances, and more particularly to cooking appliances and methods of operating such appliances which include automatically tracking elapsed time, e.g., during or after a cooking operation, and providing notifications, e.g., reminders, to a user based on the automatically tracked time.

BACKGROUND OF THE INVENTION

Oven appliances generally include a cabinet that defines a cooking chamber for cooking food items therein, such as by baking or broiling the food items. To heat the cooking chamber for cooking, oven appliances include one or more heating elements positioned at a top portion, a bottom portion, or both the top portion and the bottom portion of the cooking chamber. Some oven appliances also include a convection heating element and fan for convection cooking cycles. The heating element or elements may be used for various cycles of the oven appliance, such as a preheat cycle, a cooking cycle, or a self-cleaning cycle.

Oven appliances may include a timer feature, where a user can manually enter a desired time, and the oven appliance then tracks the manually entered time duration and may provide an alert or alarm, e.g., beep, when the time expires and/or may deactivate one or more heating elements of the oven appliance when the manually entered time expires. Such timer features can be useful when the user manually enters the desired cooking time, such as a minimum safe cooking time, as soon as the food is placed in the oven, in order to accurately track the amount of time the food has been exposed to the activated heating elements. However, if the user forgets to manually activate the timer as soon as the food is placed in the oven, the user may then have to estimate how long the food has been cooking and deduct that estimated time from the desired cooking time or minimum safe cooking time and then manually enter the resultant time value. In some instances, e.g., when the user's estimation or subtraction is not accurate, this may result in inaccurate cooking times which can lead to food that is undercooked or overcooked.

Accordingly, oven appliances and features and methods therefor which automatically track cooking time would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a method of operating a cooking appliance is provided. The method includes receiving an input from a user interface of the cooking appliance. The input includes a set temperature. The method further includes activating a heating element of the cooking appliance in response to the received input. The method also includes detecting an opening and a closing of a door of the cooking appliance. When the closing of the door is detected, a timer is automatically initiated.

In another exemplary embodiment, a cooking appliance is provided. The cooking appliance includes a cabinet with a user interface comprising an input selector on the cabinet. A cooking chamber is defined in the cabinet. The cooking chamber is configured for receipt of food items for cooking. The cooking appliance also includes a door pivotally mounted to the cabinet at a front portion of the cooking chamber. The door is rotatable between a closed positioned where the cooking chamber is sealingly enclosed and an open position which permits access to the cooking chamber. The cooking appliance also includes a heating element disposed within the cabinet and in thermal communication with the cooking chamber for cooking the food items received in the cooking chamber. The cooking appliance further includes a controller. The controller is configured for receiving an input from the user interface. The input includes a set temperature. The controller is also configured for activating the heating element of the cooking appliance in response to the received input. The controller is further configured for detecting an opening and a closing of the door of the cooking appliance. When the closing of the door is detected, the controller automatically initiates a timer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
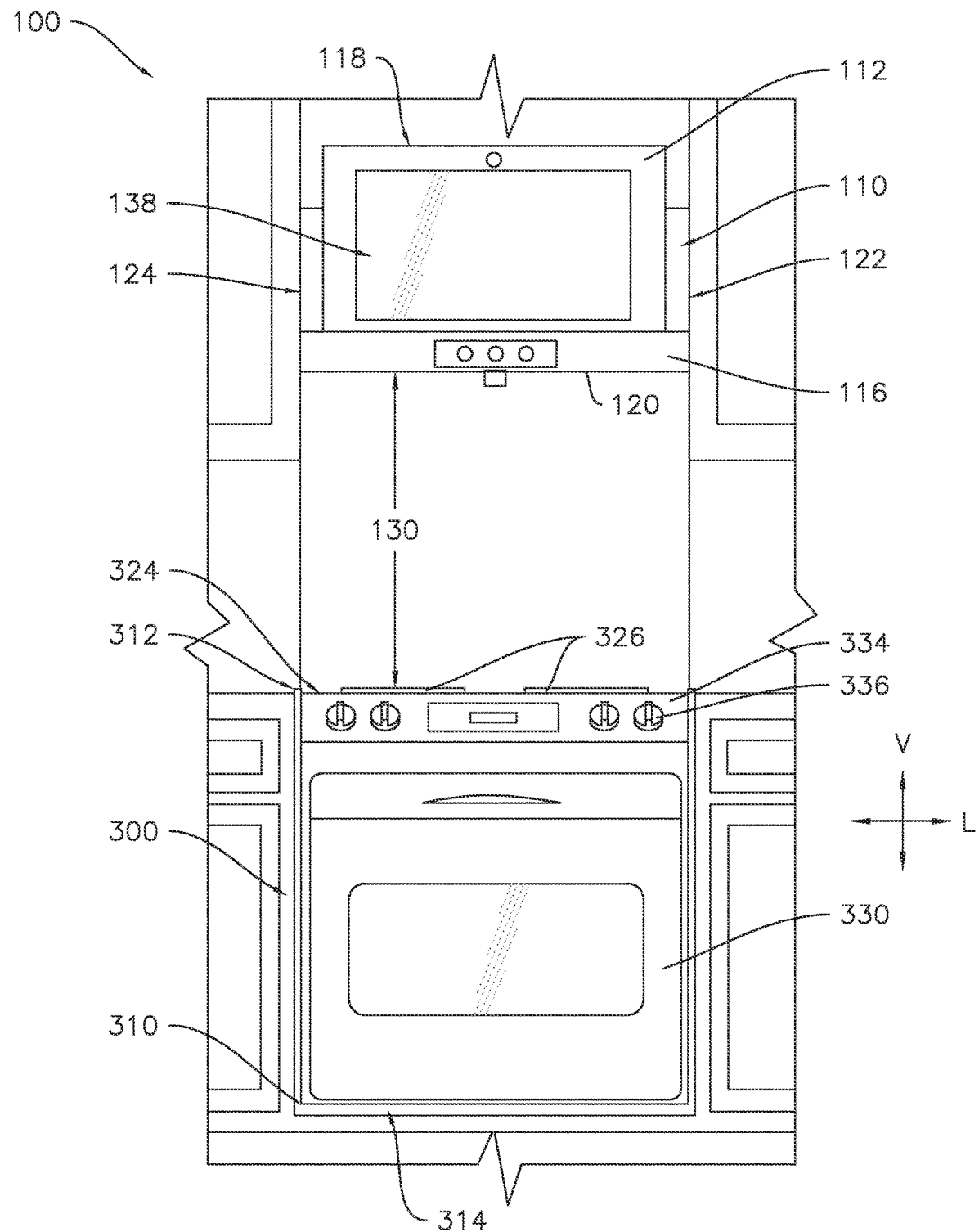
FIG. 1 provides a front view of an exemplary system including an exemplary interface assembly and an exemplary cooking appliance according to one or more example embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components.

Figure 2:
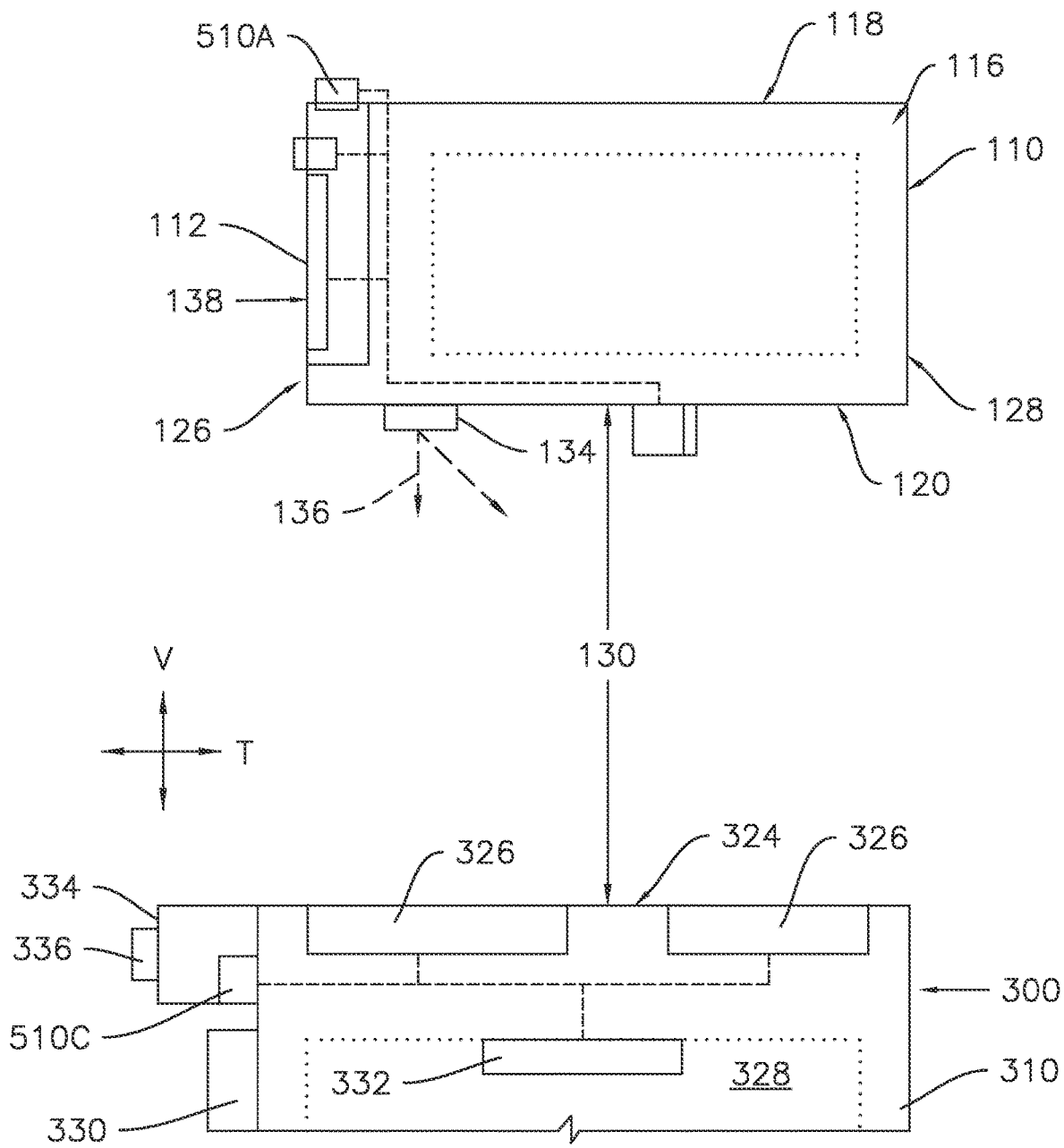
FIG. 2 provides a schematic side view of the system of FIG. 1.

FIGS. 1 and 2 provide various views of an interactive assembly 110 having a controller 510A in operable communication with an image monitor 112 that is generally positioned above a cooktop appliance 300 according to exemplary embodiments of the present disclosure.

As shown, cooktop appliance 300 defines a vertical direction V, a lateral direction L, and a transverse direction T, for example, at a cabinet 310. The vertical, lateral, and transverse directions V, L, and T are mutually perpendicular and form an orthogonal direction system. As shown, cooktop appliance 300 extends along the vertical direction V between a top portion 312 and a bottom portion 314, along the lateral direction L between a left side portion and a right side portion; and along the traverse direction T between a front portion and a rear portion.

Cooktop appliance 300 can include a chassis or cabinet 310 and a cooktop surface 324 having one or more heating elements 326 for use in, for example, heating or cooking operations. In one example embodiment, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In turn, heating element 326 may include a gas burner element, resistive heat element, radiant heat element, induction element, or another suitable heating element.

In some embodiments, the cabinet 310 may be insulated and may define a cooking chamber 328 selectively enclosed by a door 330. One or more heating elements 332 (e.g., top broiling elements or bottom baking elements) may be positioned within cabinet 310 to heat cooking chamber 328. Heating elements 332 within cooking chamber 328 may be provided as any suitable element for cooking the contents of cooking chamber 328, such as an electric resistive heating element, a gas burner, a microwave element, a halogen element, etc. Thus, cooktop appliance 300 may be referred to as an oven range appliance. As will be understood by those skilled in the art, cooktop appliance 300 is provided by way of example only, and the present subject matter may be used in the context of any suitable cooking appliance, such as a double oven range appliance or a standalone cooktop (e.g., fitted into a surface of a kitchen counter). Thus, the example embodiments illustrated and described are not intended to limit the present subject matter to any particular cooking chamber or heating element configuration, except as otherwise indicated.

As illustrated, a user interface panel 334 may be provided on cooktop appliance 300. Although shown at front portion of cooktop appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooktop appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooktop appliance 300 as well, such as heating elements (e.g., 326, 332), sensors, and the like. Input/output ("I/O") signals may be routed between controller 510C and the various operational components of cooktop appliance 300. Thus, controller 510C can selectively activate and operate these various components. Various components of cooktop appliance 300 are communicatively coupled with controller 510C via one or more communication lines such as, for example, conductive signal lines, shared communication busses, or wireless communications bands.

In some embodiments, controller 510C includes one or more memory devices and one or more processors. The processors can be any combination of general or special purpose processors, CPUs, or the like that can execute programming instructions or control code associated with operation of cooktop appliance 300. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

For example, controller 510C may be operable to execute programming instructions or micro-control code associated with an operating cycle of appliance 300. In this regard, the instructions may be software or any set of instructions that when executed by the processing device, cause the processing device to perform operations, such as running one or more software applications, displaying a user interface, receiving user input, processing user input, etc. Moreover, it should be noted that controller 510C as disclosed herein is capable of and may be operable to perform any methods, method steps, or portions of methods as disclosed herein. For example, in some embodiments, methods disclosed herein may be embodied in programming instructions stored in the memory and executed by controller 510C.

In certain embodiments, controller 510C includes a network interface such that controller 510C can connect to and communicate over one or more networks with one or more network nodes. Controller 510C can also include one or more transmitting, receiving, or transceiving components for transmitting/receiving communications with other devices communicatively coupled with cooktop appliance 300. Additionally or alternatively, one or more transmitting, receiving, or transceiving components can be located off-board of controller 510C. Generally, controller 510C can be positioned in any suitable location throughout cooktop appliance 300. For example, controller 510C may be located proximate user interface panel 334 toward front portion of cooktop appliance 300.

As shown, one or more casings (e.g., hood casing 116) may be provided above cooktop appliance 300 along the vertical direction V. For example, a hood casing 116 may be positioned above cooktop appliance 300. Hood casing 116 includes a plurality of outer walls and generally extends along the vertical direction V between a top end 118 and a bottom end 120, along the lateral direction L between a right side end 122 and a left side end 124, e.g., "right" and "left" as used herein refer to from a perspective of a user standing in front of cooktop appliance 300. The hood casing 116 may also extend along the transverse direction T between a front end 126 and a back end 128. In some embodiments, hood casing 116 is spaced apart from cooktop surface 324 along the vertical direction V. An open region 130 may thus be defined along the vertical direction V between cooktop surface 324 and bottom end 120.

In optional embodiments, hood casing 116 is formed as a range hood. For example, a ventilation assembly may be provided within hood casing 116 which may direct an airflow from the open region 130 and through hood casing 116. However, a range hood is provided by way of example only. Other configurations may be used within the spirit and scope of the present disclosure. For example, although a generally rectangular shape is illustrated, any suitable shape or style may be adapted to form the structure of hood casing 116.

In some embodiments, a lighting assembly 134 is provided above cooktop surface 324 (e.g., along the vertical direction V). For instance, lighting assembly 134 may be mounted to hood casing 116 (e.g., directly above cooktop surface 324). Generally, lighting assembly 134 includes one or more selectable light sources directed toward cooktop surface 324. In other words, lighting assembly 134 is oriented to project a light (as indicated at arrows 136) to cooktop appliance 300 through open region 130 and illuminate at least a portion of cooktop surface 324. The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooktop appliance 300 (e.g., cooktop surface 324) based on a received light visibility signal. For instance, lighting assembly 134 may be activated by controller 510A based on direct user input (e.g., depressing a dedicated switch, a gesture control signal, voice control signal, etc.). In other words, the light visibility signal may be an isolated user input signal. Alternatively, the light visibility signal may be an automatically-generated signal that does not require direct user input. The light visibility signal may indicate additional light is needed above cooktop appliance 300. In turn, controller 510A may automatically activate lighting assembly 134 based on a determined condition. Optionally, one or more camera assemblies may be mounted to hood casing 116 and directed toward cooktop appliance 300 or an area in front of cooktop appliance 300 (e.g., to operate with or independently of lighting assembly 134).

In some embodiments, image monitor 112 is provided above cooktop surface 324 (e.g., along the vertical direction V). For instance, image monitor 112 may be mounted to or supported on hood casing 116 (e.g., directly above cooktop surface 324) proximal to the front end 126. Generally, image monitor 112 may be any suitable type of mechanism for visually presenting a digital (e.g., interactive) image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image or dynamic video) to a user. Optionally, a protective transparent panel (e.g., formed from a transparent glass, plastic, etc.) may be positioned across or over imaging surface 138. In some such embodiments, the protective transparent panel is mounted within or supported on hood casing 116 forward from imaging surface 138 along the transverse direction T.

The optically-viewable picture at the imaging surface 138 may correspond to any suitable signal or data received or stored by interactive assembly 110 (e.g., at controller 510A). As an example, image monitor 112 may present recipe information in the form of viewable text or images. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110 or cooktop appliance 300. During use of such GUI embodiments, a user may engage, select, or adjust the image presented at image monitor 112 through any suitable input, such as gesture controls detected through a camera assembly, voice controls detected through one or more microphones, associated touch panels (e.g., capacitance or resistance touch panel) sensors overlaid across imaging surface 138, or any other suitable input.

As illustrated, the imaging surface 138 is directed toward the area forward from the cooktop appliance 300. During use, a user standing in front of cooktop appliance 300 may thus see the optically-viewable picture (e.g., recipe, dynamic video stream, graphical user interface, etc.) displayed at the imaging surface 138. Optionally, the imaging surface 138 may be positioned at a rearward oblique angle relative to the vertical direction V. In other words, the imaging surface 138 may be inclined such that an upper edge of the imaging surface 138 is closer to the rear end 128 of hood casing 116 than a lower edge of the imaging surface 138 is. In some such embodiments, the oblique angle is between 1° and 15° relative to the vertical direction V. In certain embodiments, the oblique angle is between 2° and 7° relative to the vertical direction V.

Figure 3:
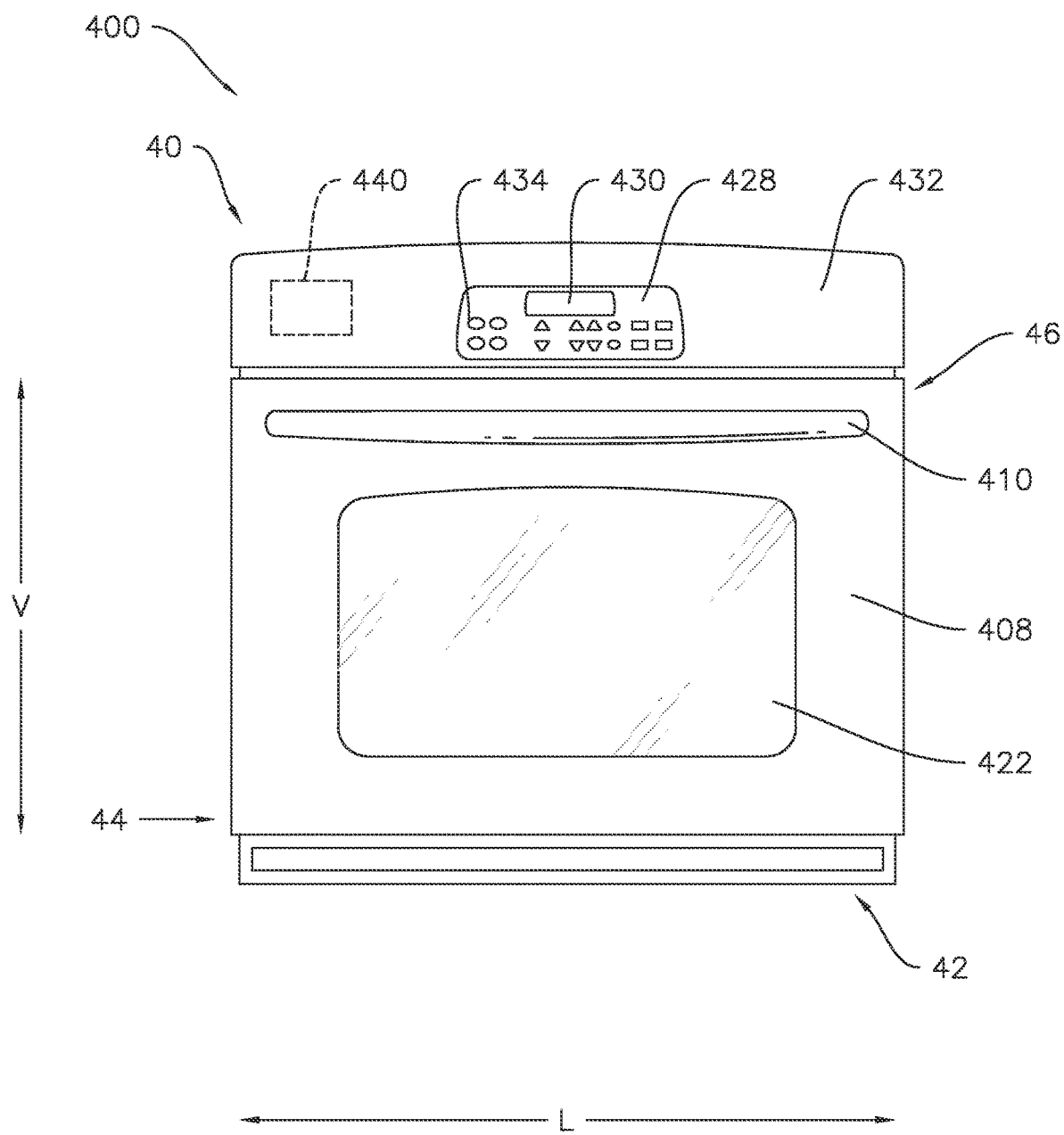
FIG. 3 provides a front view of another exemplary cooking appliance according to one or more example embodiments of the present subject matter.
Figure 4:
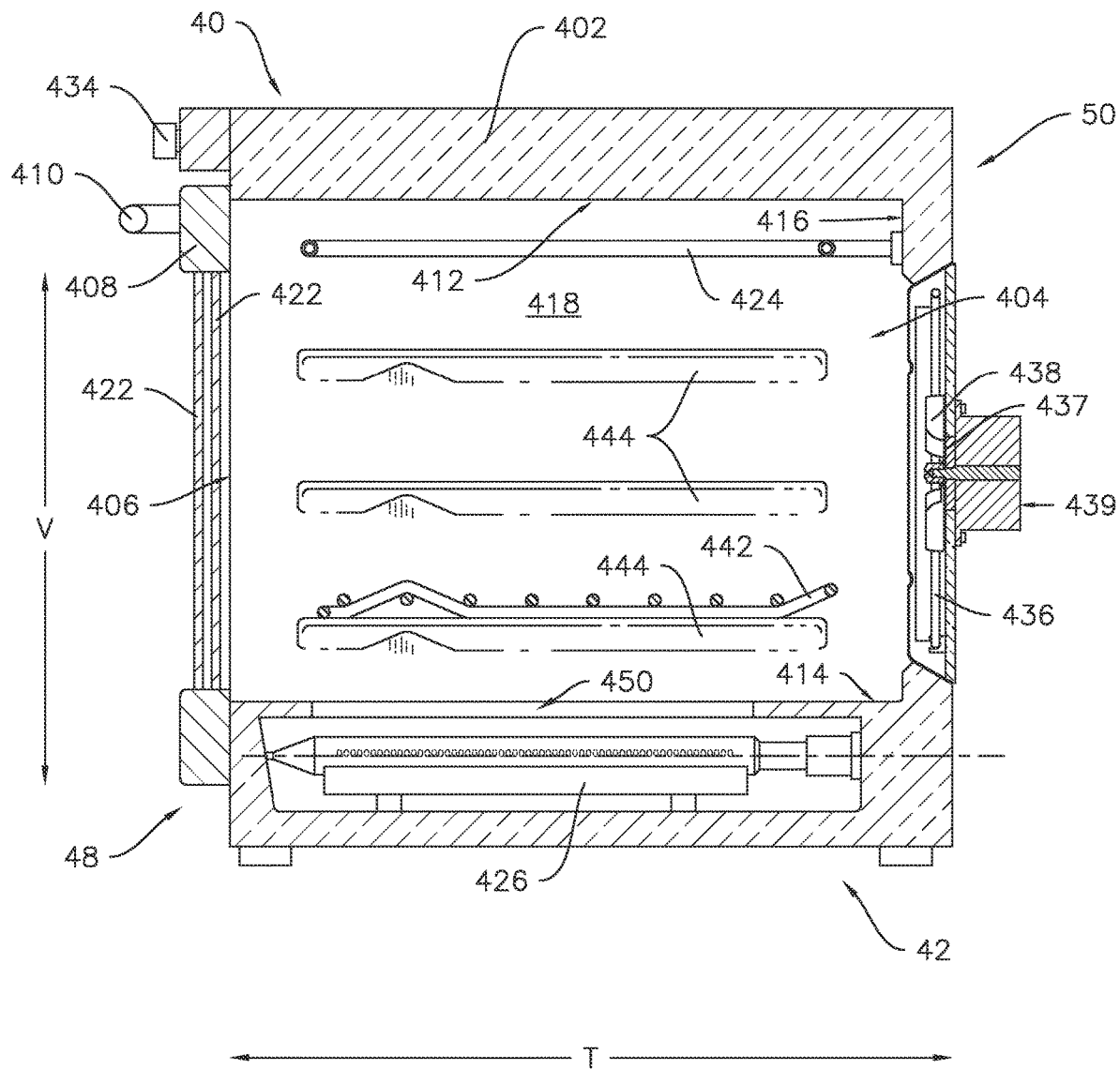
FIG. 4 provides a section view of the cooking appliance of FIG. 3.

FIGS. 3 and 4 illustrate another exemplary cooking appliance, which in this example is an oven appliance 400 according to an exemplary embodiment of the present subject matter. Oven appliance 400 includes an insulated cabinet 402 which defines a vertical direction V, a lateral direction L, and a transverse direction T. The vertical, lateral, and transverse directions V, L, and T are mutually perpendicular and form an orthogonal direction system. Cabinet 402 extends between a top portion 40 and a bottom portion 42 along the vertical direction V. Cabinet 402 extends between a left side 44 and a right side 46 along the lateral direction L and between a front portion 48 and a back portion 50 along the transverse direction T.

Still referring to FIGS. 3 and 4, for this exemplary embodiment, oven appliance 400 includes an insulated cabinet 402 with an interior cooking chamber 404 defined by a top wall 412, a floor or bottom wall 414, a back wall 416, and a pair of opposing side walls 418. Cooking chamber 404 is configured for the receipt of one or more food items to be cooked. Oven appliance 400 includes a door 408 pivotally mounted to cabinet 402 at the opening 406 of cabinet 402 to permit selective access to cooking chamber 404 through opening 406. A handle 410 is mounted to door 408 and assists a user with opening and closing door 408. For example, a user can pull on handle 410 to open or close door 408 and access cooking chamber 404.

Oven appliance 400 can include a seal (not shown) between door 408 and cabinet 402 that assists with maintaining heat and cooking vapors within cooking chamber 404 when door 408 is closed as shown in FIGS. 3 and 4. Multiple parallel glass panes 422 provide for viewing the contents of cooking chamber 404 when door 408 is closed and assist with insulating cooking chamber 404. A baking rack 442 is positioned in cooking chamber 404 for the receipt of food items or utensils containing food items. Baking rack 442 is slidably received onto embossed ribs or sliding rails 444 such that rack 442 may be conveniently moved into and out of cooking chamber 404 when door 408 is open.

One or more heating elements may be included at the top, bottom, or both of cooking chamber 404 to provide heat to cooking chamber 404 for cooking. Such heating element(s) can be gas, electric, microwave, or a combination thereof. For example, in the embodiment shown in FIG. 4, oven appliance 400 includes a top heating element 424 which, in the illustrated example embodiment is an electric resistance heating element 424, and a bake heating element or bottom heating element 426, which, in the illustrated example embodiment is a gas burner 426, and bottom heating element 426 is positioned adjacent to and below bottom wall 414.

Also as may be seen in FIG. 4, the gas burner 426 is positioned within the cabinet 402 and outside of the chamber 404. In some embodiments, for example as illustrated in FIG. 4, the gas burner 426 may be a bake heating element or bottom heating element and may be positioned below the chamber 404 and separated from the chamber 404 by a partition, e.g., the bottom wall 414 of the chamber 404. The gas burner 426 may be in thermal communication and in fluid communication with the chamber by a flow path extending through one or more apertures or openings 450 in the bottom wall 414. In at least some embodiments, the flow path may extend from the gas burner 426, e.g., from ports thereof, through the opening(s) 450, and into the cooking chamber 404.

In the illustrated example embodiment, oven appliance 400 also has a convection heating element 436 and convection fan 438 positioned adjacent back wall 416 of cooking chamber 404. Convection fan 438 is powered by a convection fan motor 439. Further, convection fan 438 can be a variable speed fan—meaning the speed of fan 438 may be controlled or set anywhere between and including, e.g., zero and one hundred percent (0%-100%). In certain embodiments, oven appliance 400 may also include a bidirectional triode thyristor (not shown), i.e., a triode for alternating current (TRIAC), to regulate the operation of convection fan 438 such that the speed of fan 438 may be adjusted during operation of oven appliance 400. The speed of convection fan 438 can be determined by controller 440. In addition, a sensor 437 such as, e.g., a rotary encoder, a Hall effect sensor, or the like, may be included at the base of fan 438, for example, between fan 438 and motor 439 as shown in the exemplary embodiment of FIG. 4, to sense the speed of fan 438. The speed of fan 438 may be measured in, e.g., revolutions per minute ("RPM"). In some embodiments, the convection fan 438 may be configured to rotate in two directions, e.g., a first direction of rotation and a second direction of rotation opposing the first direction of rotation. For example, in some embodiments, reversing the direction of rotation, e.g., from the first direction to the second direction or vice versa, may still direct air from the back of the cavity. As another example, in some embodiments reversing the direction results in air being directed from the top and/or sides of the cavity rather than the back of the cavity. Additionally, the convection heating features are optional and are shown and described herein solely by way of example. In other embodiments the oven appliance 400 may include different convection heating features or may not include convection heating features at all.

In various embodiments, more than one convection heater, e.g., more than one convection heating elements 436 and/or convection fans 438, may be provided. In such embodiments, the number of convection fans and convection heaters may be the same or may differ, e.g., more than one convection heating element 436 may be associated with a single convection fan 438. Similarly, more than one top heating element 424 and/or more than one bottom heating element 426 may be provided in various combinations, e.g., one top heating element 424 with two or more bottom heating elements 426, two or more bottom heating elements 426 with no top heating element 424, etc.

Oven appliance 400 includes a user interface 428 having a display 430 positioned on an interface panel 432 and having a variety of controls 434. Interface 428 allows the user to select various options for the operation of oven 400 including, e.g., various cooking and cleaning cycles. Operation of oven appliance 400 can be regulated by a controller 440 that is operatively coupled to, i.e., in communication with, user interface 428, heating elements 424, 426, and other components of oven 400 as will be further described.

For example, in response to user manipulation of the user interface 428, controller 440 can operate the heating element(s). Controller 440 can receive measurements from one or more temperature sensors (not shown) which are in or in thermal communication with the cooking chamber 404. Controller 440 may also provide information such as a status indicator, e.g., a temperature indication, to the user with display 430. Controller 440 can also be provided with other features as will be further described herein.

Controller 440 may include a memory and one or more processing devices such as microprocessors, CPUs, or the like, such as general or special purpose microprocessors operable to execute programming instructions or microcontrol code associated with operation of oven appliance 400. The memory may represent random access memory such as DRAM or read only memory such as ROM or FLASH. In one embodiment, the processor executes programming instructions stored in memory. The memory may be a separate component from the processor or may be included onboard within the processor. The memory can store information accessible by the processor(s), including instructions that can be executed by processor(s). For example, the instructions can be software or any set of instructions that when executed by the processor(s), cause the processor(s) to perform operations. For the embodiment depicted, the instructions may include a software package configured to operate the system, e.g., to execute exemplary methods of operating the oven appliance 400, such as method 200 described below. Controller 440 may also be or include the capabilities of either a proportional (P), proportional-integral (PI), or proportional-integral-derivative (PID) control for feedback-based control implemented with, e.g., temperature feedback from one or more sensors such as temperature sensors and/or probes, etc.

Controller 440 may be positioned in a variety of locations throughout oven appliance 400. In the illustrated embodiment, controller 440 is located next to user interface 428 within interface panel 432. In other embodiments, controller 440 may be located under or next to the user interface 428, otherwise within interface panel 432, or at any other appropriate location with respect to oven appliance 400. Generally, controller 440 will be positioned within the cabinet 402. In the embodiment illustrated in FIG. 3, input/output ("I/O") signals are routed between controller 440 and various operational components of oven appliance 400 such as heating elements 424, 426, 436, convection fan 438, controls 434, display 430, alarms, and/or other components as may be provided. In one embodiment, user interface 428 may represent a general purpose I/O ("GPIO") device or functional block.

Although shown with touch type controls 434, it should be understood that controls 434 and the configuration of oven appliance 400 shown in FIGS. 3 and 4 is provided by way of example only. More specifically, user interface 428 may include various input components, such as one or more of a variety of electrical, mechanical, or electro-mechanical input devices including rotary dials, push buttons, and touch pads. User interface 428 may include other display components, such as a digital or analog display device designed to provide operational feedback to a user. User interface 428 may be in communication with controller 440 via one or more signal lines or shared communication busses.

While oven 400 is shown as a wall oven, the present invention could also be used with other cooking appliances such as, e.g., a stand-alone oven, an oven with a stove-top, or other configurations of such ovens. Numerous variations in the oven configuration are possible within the scope of the present subject matter. For example, variations in the type and/or layout of the controls 434, as mentioned above, are possible. As another example, the oven appliance 400 may include multiple doors 408 instead of or in addition to the single door 408 illustrated. Such examples include a dual cavity oven, a French door oven, and others. As still another example, one or more of the illustrated heating elements may be substituted with microwave heating elements, or any other suitable heating elements. The examples described herein are provided by way of illustration only and without limitation.

Figure 5:
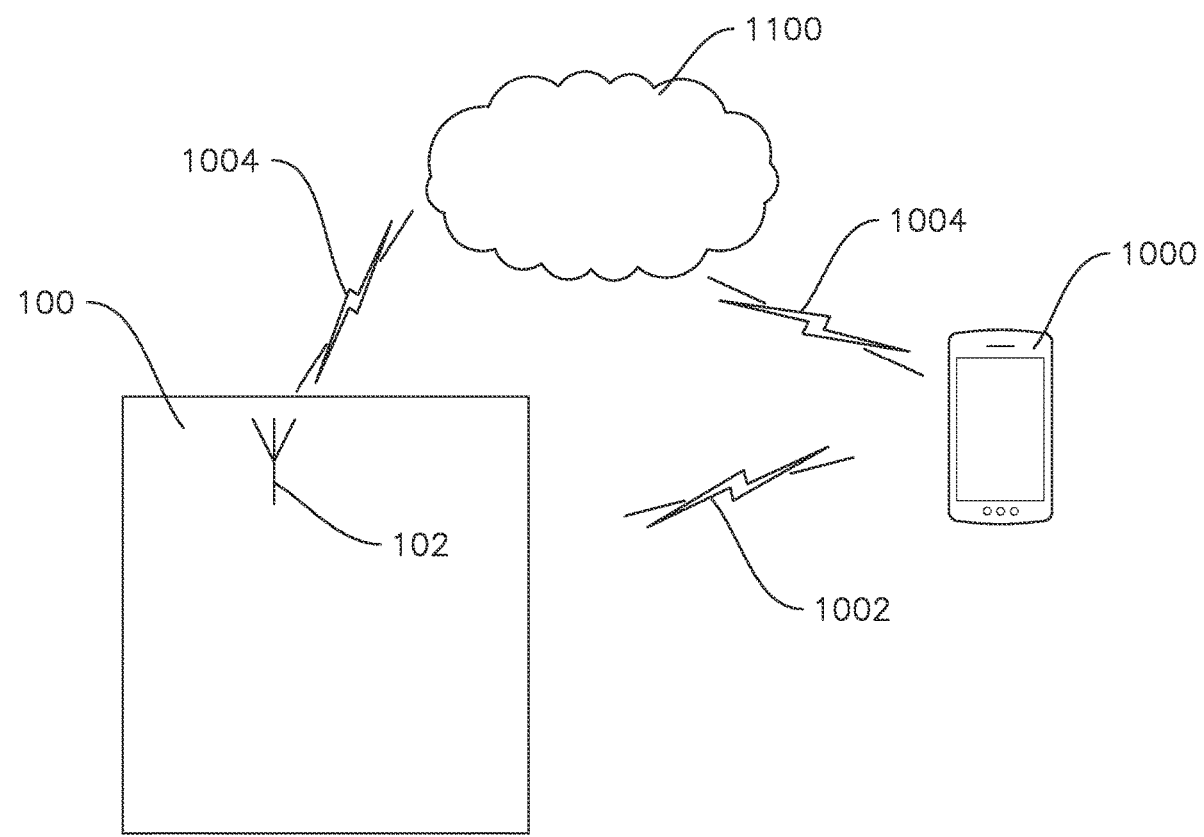
FIG. 5 provides a diagram of a cooking appliance and a remote user interface device according to one or more example embodiments of the present subject matter.

FIG. 5 schematically illustrates a cooking appliance 100, which may be, for example, the cooktop appliance 300 of FIGS. 1 and 2 or the oven appliance 400 of FIGS. 3 and 4, among other possible example cooking appliances, which communicates wirelessly with a remote user interface device 1000. For example, as illustrated in FIG. 5, the cooking appliance 100 may include an antenna by which the cooking appliance 100 communicates with, e.g., sends and receives signals to and from, the remote user interface device 1000. The cooking appliance 100 may communicate with the remote user interface device 1000 over a direct wireless communication link 1002 or over an indirect wireless communication link 1004, such as via a remote server, a network, or cloud 1100.

The remote user interface device 1000 is "remote" at least in that it is spaced apart from and not physically connected to the cooking appliance 100, e.g., the remote user interface device 1000 is a separate, stand-alone device from the cooking appliance 100 which communicates with the cooking appliance 100 wirelessly. In some embodiments, the remote user interface device 1000 may be an interactive assembly such as the exemplary interactive assembly 110 described above in context of FIGS. 1 and 2. In other embodiments, any suitable device separate from the cooking appliance 100 that is configured to provide and/or receive communications, information, data, or commands from a user may serve as the remote user interface device 1000, such as a smartphone (e.g., as illustrated in FIG. 5), smart watch, personal computer, smart home system, or other similar device. For example, the remote user interface device 1000 may be a smartphone operable to store and run applications, also known as "apps," and some or all of the method steps disclosed herein may be performed by a smartphone app.

Figure 6:
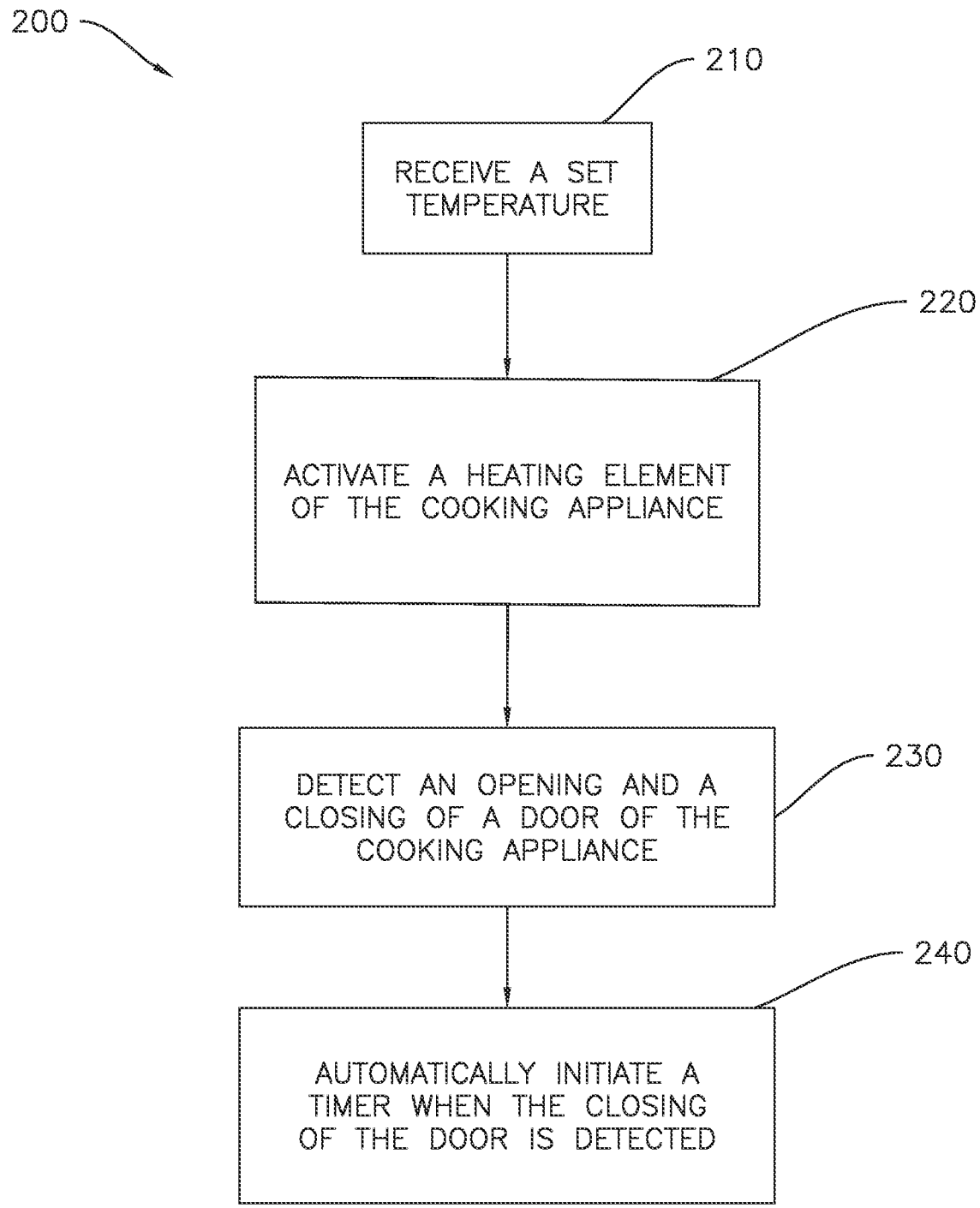
FIG. 6 provides a flow chart diagram illustrating a method according to one or more example embodiments of the present subject matter.

As illustrated in FIG. 6, embodiments of the present disclosure also include methods for operating a cooking appliance, where the cooking appliance may include any of the foregoing exemplary appliances, e.g., cooktop appliance 300 or oven appliance 400, described above. Further, methods of operating a cooking appliance according to the present disclosure are not necessarily limited to the exemplary appliances described or illustrated. For example, the cooking appliance may include various combinations of heating modules and/or heating elements as in any of the foregoing examples, such as an oven appliance with only electric radiant heating (e.g., without convection), an oven appliance with gas bake heating element and convection heating, an oven appliance with ceramic heating modules and heat lamps, among numerous other possible combinations.

An exemplary method 200 of operating a cooking appliance is illustrated in FIG. 6. As shown in FIG. 6, the method 200 may include a step 210 of receiving an input, e.g., from a user interface of the cooking appliance and/or from a remote user interface device. The input may include a set temperature. For example, the set temperature may be a preheat temperature. In embodiments where the set temperature is a preheat temperature, the cooking operation may further include operating the cooking appliance at one or more distinct temperatures other than the preheat temperature, such as after reaching the preheat temperature and/or after maintaining the preheat temperature for a period of time.

Also as illustrated in FIG. 6, the method 200 may further include a step 220 of activating a heating element of the cooking appliance in response to the received input. In some embodiments, activating more than heating element may be activated in step 220. For example, received input at step 210 may also include a cycle or operation selection, such as selecting a broil operation. In such examples, when the input includes a selection of the broil operation, an upper heating element or broil element nay be activated at step 220, e.g., as well as or in addition to a lower heating element, bake heating element, and/or a convection heating module. Other possible cycles or operations which may be indicated or selected by the received input include, but are not limited to, a bake operation or a convection mode.

After activating the heating element at step 220, the method 200 may then detect an opening and a closing of a door of the cooking appliance, e.g., as indicated at step 230 in FIG. 6. Thus, cooking appliance, e.g., a controller thereof, and/or the method 200 may infer or detect that one or more food items has been placed in the cooking chamber of the cooking appliance when the door is opened and closed after the cooking appliance has turned on, e.g., after activating one or more heating elements in response to the input from the user interface. Accordingly, detecting the opening and closing of the door may indicate that one or more food items to be cooked is exposed to, e.g., heated by, the activated heating elements.

Method 200 may further include a step 240 of automatically initiating a timer when, e.g., at the same time as or as soon as, the closing of the door is detected. Thus, the automatically initiated timer may accurately track the amount of time the one or more food items which were placed in the cooking chamber between the detected opening and the closing of the door have been heated in the cooking appliance.

The automatically initiated timer may be a reminder or backup timer. For example, the automatically initiated timer may be used in combination with a manual timer. The manual timer may, for example, be entered by or from the user interface of the cooking appliance and received by the controller of the cooking appliance from the user interface. As another example, a manual timer may also or instead be entered by or from a remote user interface device and received by the controller of the cooking appliance from the remote user interface device. In various embodiments, the automatically initiated timer may supplement or replace the manual timer, such as when a user forgets to set a timer when placing one or more food items in the cooking chamber.

For example, in some embodiments, method 200 may further include determining whether a manual timer has been initiated, e.g., via the user interface of the cooking appliance and/or via a remote user interface device. Such determination may be made after a predetermined time has elapsed, such as when (e.g., as soon as) the automatically initiated timer reaches a predetermined time limit. In some embodiments, when a manual timer has not been initiated at the time that the predetermined time limit is reached, the method 200 may further include sending a user notification when the manual timer has not been initiated. The user notification may be sent to, e.g., the user interface of the cooking appliance, such as a display thereof, and/or the remote user interface device. The user notification may include an indication that the predetermined time has elapsed, and may include a prompt to set a timer.

In some embodiments, the predetermined time limit may be based on the set temperature, e.g., the predetermined time limit may be longer when the set temperature is higher, in order to allow enough time for the cooking chamber to reach the set temperature. In some embodiments, the predetermined time limit may be a user-selected variable, such as the predetermined time limit may be set or selected via an app, e.g. on a smartphone or tablet. In some embodiments, the method 200 may also include receiving a food type input, such as the input received at step 210 may include the food type input. In such embodiments, the predetermined time limit may be based on the food type input. For example, the predetermined time limit may be longer for baked potatoes and shorter for cookies. In various embodiments, the predetermined time limit may be between about one minute and about thirty minutes, such as between about two minutes and about twenty minutes, such as between about three minutes and about ten minutes, such as about five minutes. The predetermined time limit is preferably long enough to avoid nuisance reminders, e.g., to give the user a chance to manually set the timer before sending the notification, while also short enough to prevent the food items from overcooking before the predetermined time limit elapses. Additionally, in at least some embodiments, the elapsed time of the automatically initiated timer may also be accessible in an app, such as when the user realizes he or she forgot to set the timer before the predetermined time limit elapses, so that the user then does not have to wait for the reminder notification when the predetermined time limit elapses.

After determining whether the manual timer has been initiated, the automatically initiated timer may continue to run. For example, the automatically initiated timer may also or instead provide a reminder to turn the cooking appliance off, such as after a second predetermined period of time which is generally long enough that the intended cooking operation is likely to have been completed. Thus, in some embodiments, the method 200 may further include, when the automatically initiated timer reaches a second predetermined time limit, determining whether the heating element is still activated. When the heating element is still activated at the end of the second predetermined time limit, method 200 may then include sending a user notification. The user notification that is sent after the second predetermined time limit may include a prompt to turn the oven off. In such embodiments, the method 200 may further include receiving a confirmation in response to the user notification, e.g., a "yes" response to the prompt to turn the oven off, and deactivating the heating element in response to the confirmation. The second predetermined time limit, similar to the predetermined time limit described above, may also vary based on the set temperature (e.g., preheat temperature, and/or a subsequent cooking temperature in embodiments where the cooking operation includes multiple phases with distinct temperatures), food type, and/or may be user-selectable. In various embodiments, the second predetermined time limit may be between about forty-five minutes and about three hours (one hundred eighty minutes), such as between about one hour (sixty minutes) and about two and a half hours (one hundred fifty minutes), such as between about ninety minutes and about one hundred thirty five minutes, such as about two hours (one hundred twenty minutes).

In some embodiments, the method may be iterative. For example, the method may include receiving multiple setting, multiple detections of opening/closing the door, etc. In some embodiments, for example, the set temperature received at step 210 may be an initial or first set temperature, and the method 200 may also include receiving a subsequent set temperature after the step 210 of receiving the initial set temperature. Also by way of example, the opening and closing of the door of the cooking appliance at step 230 may be an initial or first opening and closing, and the method 200 may also include detecting a subsequent opening and closing after the step 230 of detecting the initial opening and closing. Further, some embodiments may include both multiple temperature settings and multiple detected openings and closings of the door.

In such embodiments where the method 200 is iterative, e.g., when one or both of steps 210 and 230 are iterated, the timer of step 240 may include a lap timer. For example, the timer may be initiated (started) after detecting the first door opening and closing, and the timer may then record the time of the subsequent opening and/or closing of the door, while the timer continues to run so that the total time is recorded and one or more subsequent openings and closings (as well as one or more subsequent set temperatures) may also be recorded. Also by way of example, when a subsequent set temperature is received after the timer is initiated, the timer may then record the time of the subsequent set temperature being received, while the timer continues to run. For example, both the total time and the time of any subsequent events (e.g., later iterations of steps 210 and/or 230) may be transmitted to the remote user interface device 1000.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance, the method comprising:
   receiving an input, the input comprising a set temperature;
   activating a heating element of the cooking appliance in response to the received input;
   detecting a first opening and a first closing of a door of the cooking appliance;
   automatically initiating a timer when the first closing of the door is detected;
   determining, when the automatically initiated timer reaches a first predetermined time limit, whether a manual timer has been initiated;
   sending a first user notification when the manual timer has not been initiated at the first predetermined time limit;
   continuing to run the automatically initiated timer after the first predetermined time limit;
   detecting a second opening and a second closing of the door;
   recording a time of the second closing of the door;
   determining, when the automatically initiated timer reaches a second predetermined time limit, whether the heating element is still activated; and
   sending a second user notification when the heating element is still activated at the end of the second predetermined time limit, the second user notification comprising a prompt to turn the cooking appliance off.

2. The method of claim 1, wherein determining whether the manual timer has been initiated comprises determining, by a controller of the cooking appliance, whether the manual timer has been initiated from a user interface of the cooking appliance.

3. The method of claim 1, wherein determining whether the manual timer has been initiated comprises determining, by a controller of the cooking appliance, whether the manual timer has been initiated from a remote user interface device.

4. The method of claim 1, wherein at least one of the first predetermined time limit and the second predetermined time limit is based on the set temperature.

5. The method of claim 1, further comprising receiving a food type input, wherein at least one of the first predetermined time limit and the second predetermined time limit is based on the food type input.

6. The method of claim 1, wherein the first predetermined time limit is between about one minute and about thirty minutes.

7. The method of claim 1, further comprising, receiving a confirmation in response to the second user notification, and deactivating the heating element in response to the confirmation.

8. The method of claim 7, wherein the second predetermined time limit is between about forty-five minutes and about three hours.

9. The method of claim 1, wherein the set temperature is a preheat temperature.

10. A cooking appliance comprising:
    a cabinet;
    a user interface comprising an input selector on the cabinet;
    a cooking chamber defined in the cabinet, the cooking chamber configured for receipt of food items for cooking;
    a door pivotally mounted to the cabinet at a front portion of the cooking chamber, whereby the door is rotatable between a closed positioned where the cooking chamber is sealingly enclosed and an open position which permits access to the cooking chamber;
    a heating element disposed within the cabinet and in thermal communication with the cooking chamber for cooking the food items received in the cooking chamber; and
    a controller, the controller configured for:
        receiving an input, the input comprising a set temperature;
        activating the heating element of the cooking appliance in response to the received input;
        detecting first opening and a first closing of the door of the cooking appliance;
        automatically initiating a timer when the first closing of the door is detected;
        determining, when the automatically initiated timer reaches a first predetermined time limit, whether a manual timer has been initiated;
        sending a first user notification when the manual timer has not been initiated at the first predetermined time limit;
        continuing to run the automatically initiated timer after the first predetermined time limit;
        detecting a second opening and a second closing of the door;
        recording a time of the second closing of the door;
        determining, when the automatically initiated timer reaches a second predetermined time limit, whether the heating element is still activated; and
        sending a second user notification when the heating element is still activated at the end of the second predetermined time limit, the second user notification comprising a prompt to turn the cooking appliance off.

11. The cooking appliance of claim 10, wherein the controller is configured for determining whether the manual timer has been initiated by determining whether the manual timer has been initiated from the user interface.

12. The cooking appliance of claim 10, wherein the controller is configured for determining whether the manual timer has been initiated by determining whether the manual timer has been initiated from a remote user interface device.

13. The cooking appliance of claim 10, wherein at least one of the first predetermined time limit and the second predetermined time limit is based on the set temperature.

14. The cooking appliance of claim 10, wherein the controller is further configured for receiving a food type input, and wherein at least one of the first predetermined time limit and the second predetermined time limit is based on the food type input.

15. The cooking appliance of claim 10, wherein the first predetermined time limit is between about one minute and about thirty minutes.

16. The cooking appliance of claim 10, wherein the controller is further configured for receiving a confirmation in response to the second user notification, and deactivating the heating element in response to the confirmation.

17. The cooking appliance of claim 16, wherein the second predetermined time limit is between about forty-five minutes and about three hours.

18. The cooking appliance of claim 10, wherein the set temperature is a preheat temperature.

* * * * *